United States Patent
Gotou (10) Patent No.: US 8,971,252 B2
(45) Date of Patent: Mar. 3, 2015

(54) WIRELESS GATEWAY APPARATUS, COMMUNICATION SYSTEM, AND WIRELESS COMMUNICATION METHOD

(71) Applicant: Yokogawa Electric Corporation, Musashino-shi, Tokyo (JP)

(72) Inventor: Hirotsugu Gotou, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 91 days.

(21) Appl. No.: 13/744,910

(22) Filed: Jan. 18, 2013

(65) Prior Publication Data

US 2013/0188557 A1    Jul. 25, 2013

(30) Foreign Application Priority Data

Jan. 24, 2012    (JP) ................ 2012-012182

(51) Int. Cl.
| | |
|---|---|
| H04W 4/00 | (2009.01) |
| H04W 88/08 | (2009.01) |
| H04L 12/66 | (2006.01) |
| H04L 12/24 | (2006.01) |
| H04L 29/08 | (2006.01) |
| H04L 12/26 | (2006.01) |
| H04W 84/18 | (2009.01) |
| H04W 12/08 | (2009.01) |

(52) U.S. Cl.
CPC .............. *H04W 88/08* (2013.01); *H04L 12/66* (2013.01); *H04L 41/22* (2013.01); *H04L 67/36* (2013.01); *H04L 67/12* (2013.01); *H04L 43/0817* (2013.01); *H04W 84/18* (2012.01); *G05B 2219/13* (2013.01); *G05B 2219/25428* (2013.01); *G05B 2219/31093* (2013.01); *H04W 12/08* (2013.01)

USPC ........................................ 370/328; 370/395.3

(58) Field of Classification Search
CPC ........ H04W 88/08; H04L 12/66; H04L 41/22
USPC .............................................. 370/328, 395.3
See application file for complete search history.

(56) References Cited

U.S. PATENT DOCUMENTS

| | | | |
|---|---|---|---|
| 6,538,577 B1 * | 3/2003 | Ehrke et al. ............. | 340/870.02 |
| 2005/0030905 A1 | 2/2005 | Luo et al. | |

(Continued)

FOREIGN PATENT DOCUMENTS

| | | |
|---|---|---|
| JP | 2004-348319 A | 12/2004 |
| JP | 2010-097496 A | 4/2010 |

(Continued)

OTHER PUBLICATIONS

European Search Report dated Apr. 29, 2013 issued in European Patent Application No. 13151542.1.

*Primary Examiner* — Sai-Ming Chan
(74) *Attorney, Agent, or Firm* — Sughrue Mion, PLLC (57) ABSTRACT

A wireless gateway apparatus that forms a wireless communication network with wireless field devices includes a first wireless communication unit and a display unit. The first wireless communication unit is configured to communicate wirelessly with wireless field devices that have joined the wireless communication network. The display unit is configured to display at least one of device information of the wireless field devices, which is acquired by communicating with the wireless field devices, and connection information, which indicates a condition of connection with the wireless field devices.

20 Claims, 5 Drawing Sheets

(56) References Cited

U.S. PATENT DOCUMENTS

2009/0070681 A1* 3/2009 Dawes et al. ............... 715/736
2011/0238234 A1 9/2011 Chen

FOREIGN PATENT DOCUMENTS

| | | |
|---|---|---|
| JP | 2011-205607 A | 10/2011 |
| JP | 2011-229041 A | 11/2011 |

* cited by examiner

| No. | Device Tag | State | Device ID | Power Supply | Connect | Check |
|---|---|---|---|---|---|---|
| 1 | DEV_01 | Normal | 1122334411 | 100% | Active | |
| 2 | DEV_02 | Normal | 1122334422 | 70% | Active | |
| 3 | DEV_03 | Warning | 1122334433 | 50% | Active | |
| 4 | DEV_04 | Warning | 1122334444 | 30% | Active | ✓ |
| 5 | DEV_05 | Error | 1122334455 | 5% | Inactive | |
| 6 | DEV_06 | Normal | 1122334466 | 80% | Active | |
| 7 | DEV_07 | Normal | 1122334477 | 100% | Active | |
| 8 | DEV_08 | Normal | 1122334488 | 100% | Active | |
| 9 | DEV_09 | Warning | 1122334499 | 40% | Active | ✓ |
| 10 | DEV_10 | Warning | 1122334400 | 50% | Active | |

Network ID:799  Connected Device:50

WIRELESS GATEWAY APPARATUS, COMMUNICATION SYSTEM, AND WIRELESS COMMUNICATION METHOD

BACKGROUND OF THE INVENTION

1. Field of the Invention

The present invention relates to a wireless gateway apparatus, a communication system, and a wireless communication method that are capable of wireless communication with wireless field devices in a plant, a factory, or the like.

Priority is claimed on Japanese Patent Application No. 2012-012182, filed Jan. 24, 2012, the content of which is incorporated herein by reference.

2. Description of the Related Art

All patents, patent applications, patent publications, scientific articles, and the like, which will hereinafter be cited or identified in the present application, will hereby be incorporated by reference in their entirety in order to describe more fully the state of the art to which the present invention pertains.

Conventionally, in order to implement a high level of automated operation in plants, factories, and the like, distributed control systems (DCSs), in which on-site equipment (measurement instruments and actuators) known as field devices are connected to controllers that control the field devices, via a communication means, have been implemented. Although the communication system that forms the core of such distributed control systems conventionally performs communication by cable, in recent years those that communicate wirelessly, conforming to such wireless communication standards such as ISA 100.11a have appeared.

The constitution of a communication system conforming to the above-noted ISA 100.11a wireless communication standard can be broadly divided into field devices capable of wireless communication (wireless field devices), a wireless gateway apparatus, and monitoring apparatuses. The wireless gateway apparatus forms a wireless communication network with field devices, controls the operation of field devices that are joined to the network, and also performs functions that include collection of various data obtained by the wireless field devices. Monitoring apparatuses are connected to the wireless gateway apparatus via a communication line, and monitor the wireless field devices via the wireless gateway apparatus.

Japanese Unexamined Patent Applications, First Publication Nos. 2011-229041 and 2011-205607 disclose examples of communication systems conforming to the above-described ISA 100.11a wireless communication standard. Specifically, these patent references disclose art for reducing the work (work of recording configuration information) required when a field device is newly joined into a wireless communication network.

In the above-described communication systems, a maintenance worker goes on-site, periodically or when a problem arises, to acquire information regarding a wireless field device (hereinafter referred to as device information) and information indicating the connection status between the wireless field device and the wireless gateway apparatus (hereinafter referred to as connection information). In this case, the above-noted device information is characteristic information set into each of the wireless field devices and information indicating the current status of the wireless field device, and the above-noted connection information is information indicating the current number of field device connections to the wireless gateway apparatus and the connection statuses.

The maintenance worker can verify the above-noted device information by the following methods (1) to (3).

(1) The method of visually verifying device information displayed on a display device of the wireless field device.

(2) The method of connecting a dedicated terminal, either wirelessly or by cable, to the wireless field device and, by communicating with the wireless field device, verifying device information acquired by the dedicated terminal.

(3) The method of connecting a dedicated terminal to the wireless gateway apparatus and, by communicating with the wireless field device via the wireless gateway apparatus, verifying device information acquired by the dedicated terminal.

It is also possible for a maintenance worker to verify the above-noted connection information by the following method (4).

(4) The method of connecting a dedicated terminal to the wireless gateway apparatus and, by communicating with the wireless gateway apparatus, verifying connection information acquired by the dedicated terminal.

To verify device information by the above-described methods (1) and (2), it is necessary for the maintenance worker to go to the installation location of the wireless field device. Because many wireless field devices are installed at points that are scattered within a site, and some are installed at high locations that are difficult to reach, the efficiency of work is poor. Also, when verifying device information or connection information by the above-described methods (2) to (4), because it is necessary to operate the dedicated terminal and communicate with the wireless gateway apparatus or the wireless field device, these methods are troublesome.

SUMMARY

A wireless gateway apparatus that forms a wireless communication network with wireless field devices may include: a first wireless communication unit configured to communicate wirelessly with wireless field devices that have joined the wireless communication network; and a display unit configured to display at least one of device information of the wireless field devices, which is acquired by communicating with the wireless field devices, and connection information, which indicates a condition of connection with the wireless field devices.

The device information may be at least one of characteristic information set into each of the wireless field devices and information indicating a current condition of each of the wireless field devices. The connection information may include at least one of information indicating a number of connections of wireless field devices and information indicating the condition of connection with the wireless field devices.

The wireless gateway apparatus may further include: a control unit configured to be capable of changing information displayed on the display unit, in response to an external instruction.

The wireless gateway apparatus may further include: a memory configured to store the device information, the connection information, and filter information, the filter information being information used for selecting information that is to be displayed and information that is not to be displayed when displaying the device information and the connection information that are stored in the memory on the display unit.

If there is the filter information stored in the memory, a control unit may read the filter information from the memory and, based on the filter information, select information of the device information and the connection information that is to be displayed and information thereof that is not to be displayed.

The display unit may be configured to display the device information, which includes tag information and ID (identifier) information set for each of the wireless field devices and information indicating operating state and remaining battery capacity of each of the wireless field devices, the connection information, and instruction information indicating a wireless field device that needs a maintenance.

If a wireless field device is to be newly joined to the wireless communication network, the control unit may reference ID information included in a join request transmitted from the wireless field device and ID information that had been included in the device information stored in the memory beforehand and, based on a result of referencing, to determine whether or not the wireless field device is to be joined in the wireless communication network. If the control unit determines that the wireless field device is to be joined in the wireless communication network, the control unit may set tag information with respect to the wireless field device to be newly joined, store as the device information the set tag information, along with the ID information, into the memory, and increment information indicating the number of wireless field device connections that is included in the connection information stored in the memory, thereby increasing the number of wireless field devices that are joined into the wireless communication network.

The control unit may be configured to control the first wireless communication unit to communicate periodically or non-periodically with the wireless field devices via the wireless communication network so as to acquire the connection information of each of the wireless field devices and the device information of each of the wireless field devices, and to store the connection information and the device information into the memory.

If the device information and the connection information are stored into the memory, the control unit may read the device information, the connection information, and the filter information from the memory and, based on the filter information, select information of the device information and the connection information that is to be displayed and that is not to be displayed, and control only the information selected for display to be displayed on the display unit.

If there is no filter information stored in the memory, the control unit, without performing processing to select the device information and the connection information, may perform processing to display all of the device information and the connection information on the display unit.

A communication system may include: a wireless gateway apparatus that forms a wireless communication network with wireless field devices, the wireless gateway apparatus including a first wireless communication unit configured to communicate wirelessly with wireless field devices that have joined the wireless communication network; and a display apparatus configured to display at least one of device information of the wireless field devices, which is acquired by communicating with the wireless field devices, and connection information, which indicates a condition of connection with the wireless field devices. The display apparatus may be separated from the wireless gateway apparatus.

The display apparatus may be connected to the wireless gateway apparatus by a connecting cable and display at least one of the device information and the connection information transmitted from the wireless gateway apparatus via the connecting cable.

The display apparatus may include a second wireless communication unit configured to communicate wirelessly with the wireless gateway apparatus, and display at least one of the device information and the connection information received from the wireless gateway apparatus via the second wireless communication unit.

The communication system may further include a control unit configured to be capable of changing information displayed on the display apparatus, in response to an external instruction.

A wireless communication method that forms a wireless communication network with wireless field devices to communicate wirelessly with wireless field devices that have joined the wireless communication network may include: displaying at least one of device information of the wireless field devices, which is acquired by communicating with the wireless field devices, and connection information, which indicates a condition of connection with the wireless field devices.

The device information may be at least one of characteristic information set into each of the wireless field devices and information indicating a current condition of each of the wireless field devices. The connection information may include at least one of information indicating a number of connections of wireless field devices and information indicating the condition of connection with the wireless field devices.

The wireless communication method may further include: storing the device information, the connection information, and filter information in a memory, the filter information being information used for selecting information that is to be displayed and information that is not to be displayed when displaying the device information and the connection information that are stored in the memory; and reading the filter information from the memory and, based on the filter information, selecting information of the device information and the connection information that is to be displayed and information thereof that is not to be displayed.

The wireless communication method may further include: if a wireless field device is to be newly joined to the wireless communication network, referencing ID information included in a join request transmitted from the wireless field device and ID information that had been included in the device information stored in the memory beforehand and, based on a result of referencing, and determining whether or not the wireless field device is to be joined in the wireless communication network; and setting tag information with respect to the wireless field device to be newly joined, storing as the device information the set tag information, along with the ID information, into the memory, and incrementing information indicating the number of wireless field device connections that is included in the connection information stored in the memory, thereby increasing the number of wireless field devices that are joined into the wireless communication network if the wireless field device is determined to be joined in the wireless communication network.

The wireless communication method may further include: communicating periodically or non-periodically with the wireless field devices via the wireless communication network so as to acquire the connection information of each of the wireless field devices and the device information of each of the wireless field devices; and storing the connection information and the device information into the memory.

The wireless communication method may further include: reading the device information, the connection information, and the filter information from the memory and, based on the filter information, selecting information of the device information and the connection information that is to be displayed and that is not to be displayed, and controlling only the information selected for display to be displayed if the device information and the connection information are stored into the memory.

BRIEF DESCRIPTION OF THE DRAWINGS

The above features and advantages of the present invention will be more apparent from the following description of certain preferred embodiments taken in conjunction with the accompanying drawings, in which.

DETAILED DESCRIPTION OF THE PREFERRED EMBODIMENTS

The present invention will be now described herein with reference to illustrative preferred embodiments. Those skilled in the art will recognize that many alternative preferred embodiments can be accomplished using the teaching of the present invention and that the present invention is not limited to the preferred embodiments illustrated herein for explanatory purposes.

Figure 1:
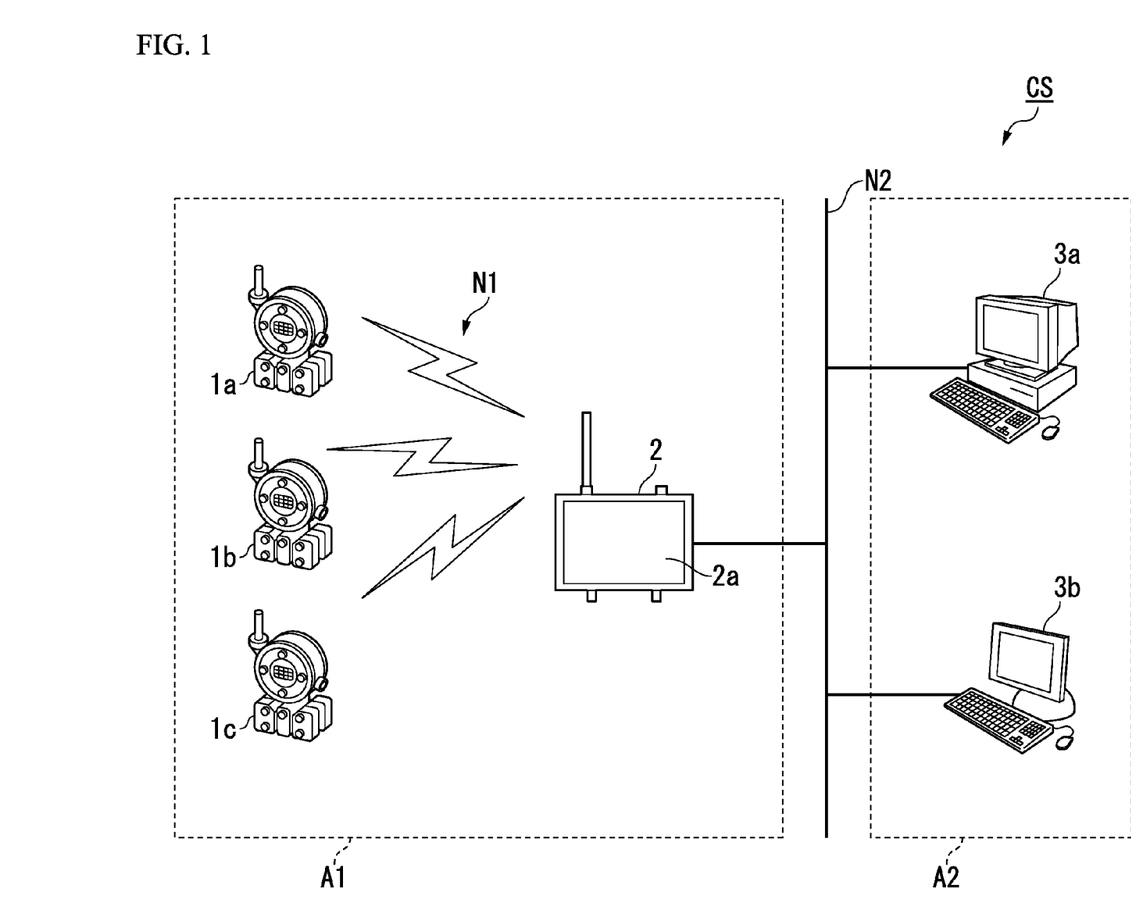
FIG. 1 is a block diagram showing the overall constitution of a communication system in which a wireless gateway apparatus is used in accordance with a first preferred embodiment of the present invention.

FIG. 1 is a block diagram showing the overall constitution of a communication system in which a wireless gateway apparatus is used in accordance with a first preferred embodiment of the present invention. As shown in FIG. 1, a communication system CS includes wireless field devices 1a to 1c, a wireless gateway apparatus 2, and monitoring apparatuses 3a and 3b. In the communication system CS, communication via a wireless communication network N1 and a backbone network N2 can be performed.

In FIG. 1, the rectangular region marked by the reference symbol A1 indicates the on-site location of a plant or the like, at which the wireless field devices 1a to 1c and the wireless gateway apparatus 2 are installed. The rectangular region marked by the reference symbol A2 indicates a monitoring room in a corner or the plant or the like, in which the monitoring apparatuses 3a and 3b are installed. In the example shown in FIG. 1, because the monitoring room A2 is at a distance from the on-site location A1, the on-site location A1 and the monitoring room A2 are connected via the backbone network N2. Although FIG. 1 shows the three wireless field devices 1a to 1c, the number of wireless field devices is arbitrary.

The wireless field devices a1 to 1c are, for example, sensor devices such as flow gauges and temperature sensors, valve devices such as flow control valves and open/close valves, actuator devices such as fans and motors, and other devices installed in a plant or factory. The wireless field devices a1 to 1c communicate wirelessly in conformance with the ISA 100.11a, which is a wireless communication standard for industrial automation. The operation of the wireless field devices 1a to 1c is controlled based on control data transmitted via from the monitoring apparatuses 3a and 3b via the wireless gateway apparatus 2. The measurement data acquired by the wireless field devices 1a to 1c is collected in the wireless gateway apparatus 2.

The wireless gateway apparatus 2 forms the wireless communication network N1 between the wireless gateway apparatus 2 and the wireless field devices 1a to 1c, and communicates wirelessly with the wireless field devices 1a to 1c that are joined into the wireless communication network N1. The wireless gateway apparatus 2 is also connected to the backbone network N2 to which the wireless communication network N1 and the monitoring apparatuses 3a and 3b are connected, and relays various data that is transmitted and received between the wireless field devices 1a to 1c and the monitoring apparatuses 3a and 3b. The wireless gateway apparatus 2 can communicate wirelessly in conformance with the above-noted ISA 100.11a wireless communication standard. The wireless gateway apparatus 2 performs control of the wireless communication via the wireless communication network N1 and joining processing as to whether or not a wireless field device is to be joined to the wireless communication network N1.

The wireless gateway apparatus 2 has a display device 2a that can display at least one of device information which is information regarding the wireless field devices 1a to 1c, and connection information, which is information indicating the connection condition between the wireless field devices 1a to 1c and the wireless gateway apparatus 2. The display device 2a is implemented, for example, by a liquid-crystal display device that has a touch panel.

In this case, the above-noted device information is characteristic information set into each of the wireless field devices and information indicating the current status of the wireless field devices. Specifically, the characteristic information is tag information or ID (identifier) information set in each of the wireless field devices 1a to 1c. The information indicating the current status is information indicating the operating condition and amount of remaining battery capacity of the wireless field devices 1a to 1c. The operating status of the wireless field devices 1a to 1c include the normal status (Normal), warning status (Warning), and error status (Error).

The above-noted connection information is information indicating the number of connections of the wireless field devices 1a to 1c that are connected to the wireless gateway apparatus 2 and the connection condition thereof. Specifically, the information indicating the number of connections of the wireless field devices is information indicating the number of the wireless field devices 1a to 1c joined to the wireless communication network N1. The information indicating the connection condition of the wireless field devices 1a to 1c is information indicating whether or not communication is possible with the wireless gateway apparatus 2 (that is, Active or Inactive). The internal constitution of the wireless gateway apparatus 2 will be described later.

The monitoring apparatuses 3a and 3b are connected to the backbone network N2, which is a cable network, and is, for example, an apparatus that is operated by an administrator of the communication system CS. The monitoring apparatuses 3a and 3b communicate, for example, with the wireless gateway apparatus 2 in response to operation by an administrator, acquire information regarding the wireless field devices 1a to 1c (measurement data and information indicating abnormalities (alarms) and the like), and monitor the wireless field devices 1a to 1c.

Figure 2:
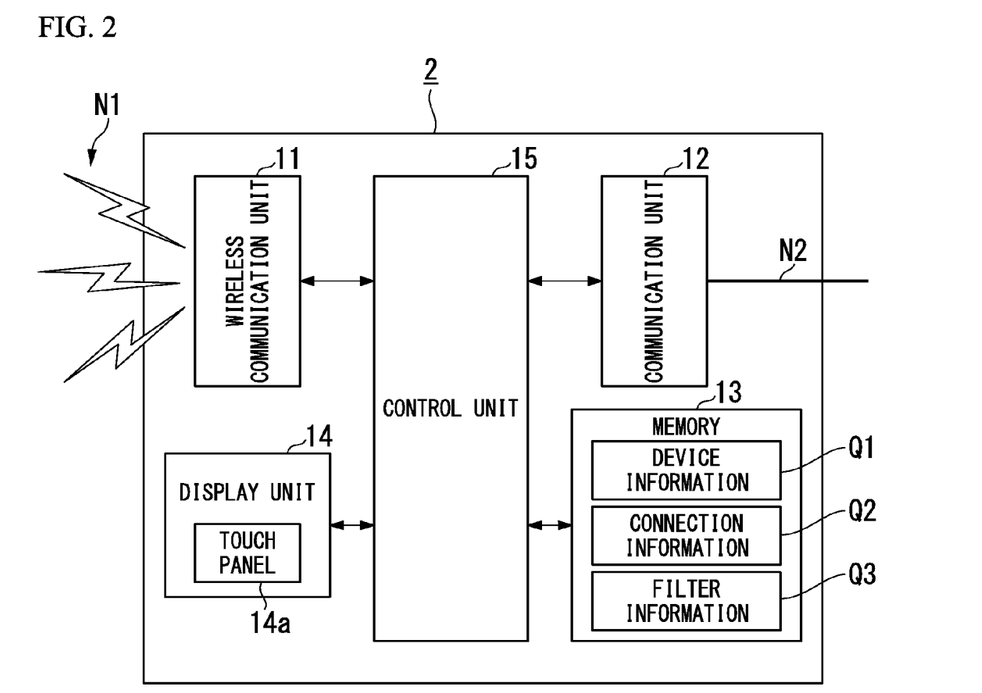
FIG. 2 is a block diagram showing the main parts of the constitution of a wireless gateway apparatus in accordance with the first preferred embodiment of the present invention.

Next, the internal constitution of the wireless gateway apparatus 2 will be described. FIG. 2 is a block diagram showing the main parts of the constitution of a wireless gateway apparatus in accordance with the first preferred embodiment of the present invention. In FIG. 2, of the constitution of the wireless gateway apparatus 2, only the elements that are required to describe the present invention are shown. As shown in FIG. 2, the wireless gateway apparatus 2 includes a wireless communication unit 11 (a first wireless communication unit), a communication unit 12, a memory 13, and display unit 14, and a control unit 15.

Under the control of the control unit 15, the wireless communication unit 11 communicates wirelessly with the wireless field devices 1a to 1c, via the wireless communication network N1. The wireless communication by the wireless communication unit 11 conforms to the ISA 100.11a wireless communication standard. Under the control of the control unit 15, the communication unit 12 communicates with the monitoring apparatuses 3a and 3b (by cable communication), via the backbone network N2.

The memory 13 is, for example, a non-volatile semiconductor memory, and stores the above-described device information Q1, the above-described connection information Q2, and filter information Q3. In this case, the filter information Q3 is information used for selecting information that is to be displayed and information that is not to be displayed when displaying device information Q1 and connection information Q2 that are stored in the memory 13 on the display unit 14 (the display device 2a). The device information Q1 and the connection information Q2 are periodically updated by the control unit 15. The filter information Q3 is, for example, updated in response to instructions from a maintenance worker who works on-site.

The display unit 14 includes a display device 2a shown in FIG. 1. The display unit 14 displays at least one of the device information Q1 and the connection information Q2 under the control of the control unit 15. The display unit 14 has a touch panel 14a (a touch panel provided on the display unit 2a) and when, for example, an on-site maintenance worker operates the touch panel 14a, outputs an instruction to the control unit 15 in response to the instruction.

The control unit 15 performs overall control of the operation of the wireless gateway apparatus 2. For example, the control unit 15 controls the wireless communication unit 11 to communicate with the wireless field devices 1a to 1c that are joined to the wireless communication network N1. The control unit 15 also controls the wireless communication unit 11 and the communication unit 12 to relay various data that is transmitted and received between the wireless field devices 1a to 1c and the monitoring apparatuses 3a and 3b. The control unit 15 also performs joining processing as to whether or not a wireless field device is to be joined to the wireless communication network N1.

The control unit 15 reads the device information Q1 and the connection information Q2 stored in the memory 13 and controls its display on the display unit 14 (display device 2a). In this case, if there is filter information Q3 stored in the memory 13, the control unit 15 reads the filter information Q3 from the memory 13 and, based on the filter information Q3, selects information of the device information Q1 and the connection information Q2 that is to be displayed and information thereof that is not to be displayed. The control unit 15 controls so that only the information selected as information to be displayed is displayed on the display unit 14. Because the control unit 15 selects, based on the filter information Q3, which information of the device information Q1 and the connection information Q2 is to be displayed and which information thereof is not to be displayed, when the filter information Q3 is updated, the device information Q1 and the connection information Q2 displayed on the display unit 14 (display device 2a) are also updated.

Additionally, when there is instruction information from the monitoring apparatuses 3a and 3b, the control unit 15 displays the device information Q1, the connection information Q2, and the instruction information on the display unit 14. The instruction information is information that identifies a wireless field device regarding which a maintenance worker should perform verification, this being a type of information that indicates an instruction to a maintenance worker by an administrator operating the monitoring apparatuses 3a and 3b.

Figure 3:
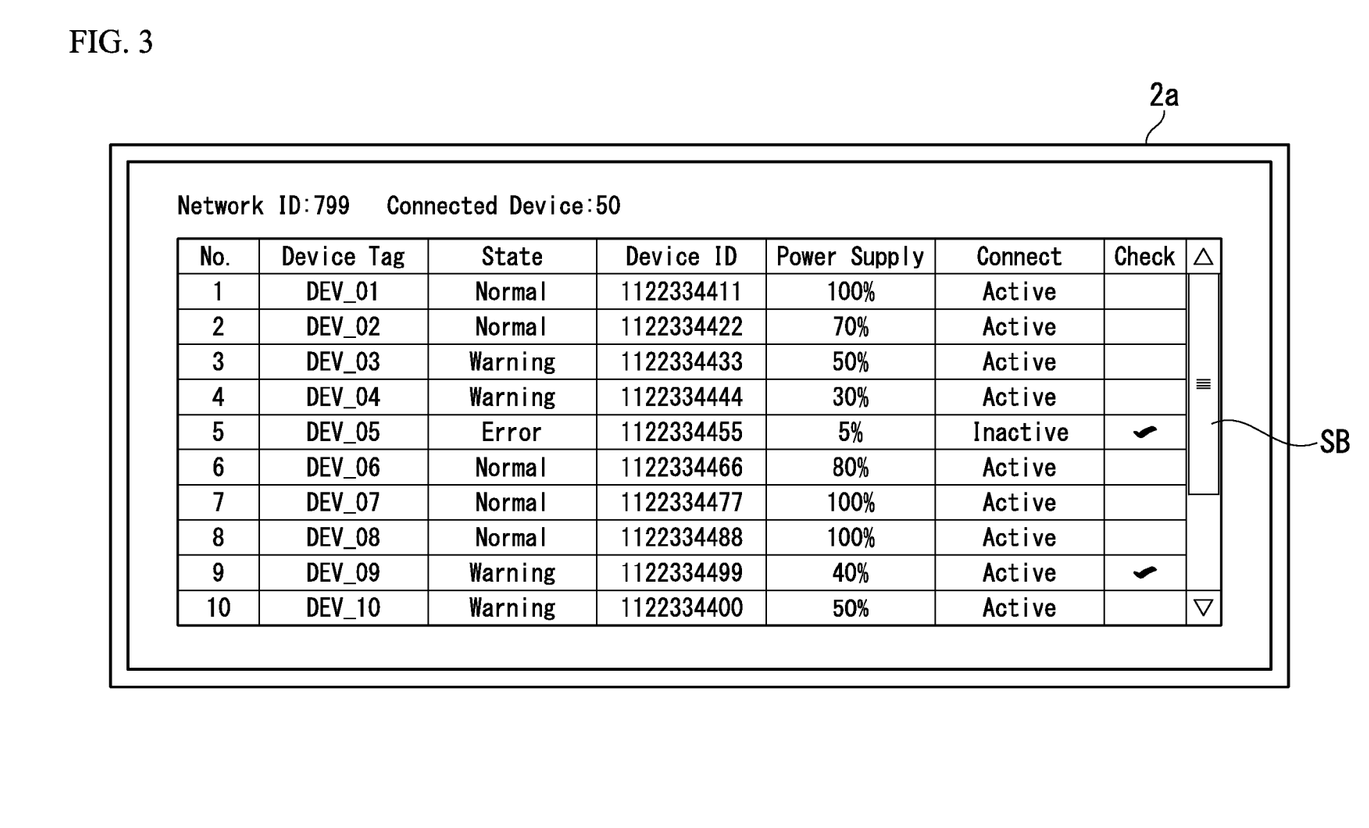
FIG. 3 shows an example of the content displayed on the wireless gateway apparatus in accordance with the first preferred embodiment of the present invention.

FIG. 3 shows an example of the content displayed on the wireless gateway apparatus in accordance with the first preferred embodiment of the present invention. As shown in FIG. 3, a list display is made, on the display device 2a of the wireless gateway apparatus 2, of the device information Q1, the connection information Q2, and the instruction information for each of the wireless field devices that are joined in the wireless communication network N1. If display of all of the device information Q1, the connection information Q2, and the instruction information is not possible to display on the display device 2a, only a part thereof is displayed, and a vertical scroll bar SB for displaying the remaining part is displayed.

The Network ID shown in FIG. 3 is an identifier allocated to the wireless communication network N1. This identifier is allocated by the wireless gateway apparatus 2 that manages the wireless communication network N1. The Connected Device in FIG. 3 is information included in the connection information Q2 and indicating the number of wireless field devices that are connected. In the example shown in FIG. 3, 799 is allocated as the Network ID, and there are 50 wireless field devices connected.

Additionally, as shown in FIG. 3, a list display is made of No., Device Tag, State, Device ID, Power Supply, Connect, and Check for each of the wireless field devices. The No. is a serial number assigned by the control unit 15 for the purpose of distinguishing between the wireless field devices, the device information Q1, the connection information Q2, and the instruction information of which are list displayed by the display device 2a.

The Device Tag and the Device ID are tag information and ID (identifier) information individually set for each of the wireless field devices, and are characteristic information included in the device information Q1. The State and Power Supply are information indicating, respectively, the operating state and the remaining battery capacity of the wireless field devices, and are information included in the device information Q1 that indicates the current condition of the wireless field devices. As shown in FIG. 3, the operating state of the wireless field devices can be normal (Normal), warning (Warning) or error (Error). The remaining battery capacity is displayed as a percentage of capacity, with the fully charged condition as 100%.

The Connect is information included in the connection information Q2 and indicates the connection condition of the wireless field devices. The connection condition of a wireless field device can be communication possible (Active) or communication not possible (Inactive). The Check is instruction information that is displayed along with the device information Q1 and the connection information Q2, and is displayed as a symbol (checkmark) as information indicating wireless field devices that a maintenance worker should check.

Next, the operation of the wireless gateway apparatus 2 in the above-noted constitution will be briefly described. When a wireless field device is to be newly joined to the wireless communication network N1, the control unit 15 references the ID information and the like included in a join request transmitted from a wireless field device and ID information and the like that had been included in the device information Q1 stored in the memory 13 beforehand. The control unit 15, based on the result of this referencing, determines whether or not the wireless field device is to be joined and, if the determination is to join, sets tag information with respect to the wireless field device to be newly joined.

If the joining of a new wireless field device is to be allowed, the control unit 15 stores as device information Q1 the set tag information, along with the above-noted ID information, into the memory 13. The control unit 15 increments the information indicating the number of wireless field device connections that is included in the connection information Q2 stored in the memory 13, thereby increasing the number of wireless field devices that are joined into the wireless communication network N1.

The control unit 15 controls the wireless communication unit 11 to communicate periodically or non-periodically with the wireless field devices 1a to 1c, via the wireless communication network N1, so as to acquire information indicating the connection condition of the wireless field devices 1a to 1c, and also to acquire information indicating the current condition of the wireless field devices 1a to 1c. The control unit 15 stores the former information (information indicating the connection condition of the wireless field devices 1a to 1c) as connection information Q2 into the memory 13, and stores the latter information (information indicating the current condition of the wireless field devices 1a to 1c) as device information Q1 into the memory 13.

When device information Q1 and connection information Q2 are stored into the memory 13, the control unit 15 reads the filter information, along with the device information Q1 and the connection information Q2 from the memory 13 and, based on the filter information, selects the information of the device information Q1 and the connection information Q2 that is to be displayed and that is not to be displayed. For example, only information corresponding to one of Power Supply being 20% or less, State being Warning or Error, Connect being Inactive, and a checkmark being set as the instruction information is selected for display, with the remaining information being not displayed. Only the information selected for display is displayed on the display unit 14. By the above-noted processing, content such as shown in FIG. 3 is displayed on the display device 2a.

If there is no filter information Q3 stored in the memory 13, the control unit 15, without performing processing to select the device information Q1 and the connection information Q2, performs processing to display all of the device information Q1 and the connection information Q2 on the display device 2a. The above-described processing is performed each time the device information Q1 and the connection information Q2 are updated, and also when the filter information Q3 is updated.

As described above, in the first preferred embodiment, the display device 2a that displays the device information Q1 acquired by communication with the wireless field devices 1a to 1c and the connection information Q2 indicating the connection condition of the wireless field devices 1a to 1c is provided in the wireless gateway apparatus 2. For this reason, by just visually referencing the displayed content on the display device 2a provided in the wireless gateway apparatus 2, a maintenance worker can verify device information Q1 of the wireless field devices 1a to 1c. By doing this, there is no need to make the rounds of the wireless field devices 1a to 1c for visual verification of the device information Q1, thereby enabling efficient and easy verification of on-site conditions.

In the first preferred embodiment, the wireless gateway apparatus 2 is configured to automatically acquire and display on the display device 2a the device information Q1 and the connection information Q2. For this reason, there is no need, as there conventionally is, to use a dedicated terminal to communicate between wireless field devices 1a to 1c and the wireless gateway apparatus 2 in order to acquire the device information Q1 and the connection information Q2. As a result, the task of verifying on-site conditions is simplified.

Additionally, in the first preferred embodiment, selection of information of the device information Q1 and the connection information Q2 to be displayed and not displayed is made by in accordance with the filter information Q3. For this reason, even if there are many wireless field devices (for example, approximately one hundred), it is possible to display only the information required for maintenance. By doing this, a maintenance worker need only reference the content displayed on the display device 2a provided in the wireless gateway apparatus 2 to identify wireless field devices that should be checked, thereby improving the work efficiency.

Although the first preferred embodiment was described for an example in which the device information Q1 and the connection information Q2 are displayed in a list display, as described using FIG. 3, the device information Q1 and the connection information Q2 may be displayed as icons or the like, to facilitate a grasp of the displayed content. For example, the remaining battery capacity (Power Supply) could be displayed as a bar graph.

Also, although in the first preferred embodiment the display device 2a is provided in the wireless gateway apparatus 2, the display device 2a may be separated from the main unit of the wireless gateway apparatus 2. In this case, the expression main unit would be the part in which the wireless communication unit 11, the communication unit 12, the memory 13, and the control unit 15 are provided, which implements the functionality of the main unit of the wireless gateway apparatus 2.

Figure 4:
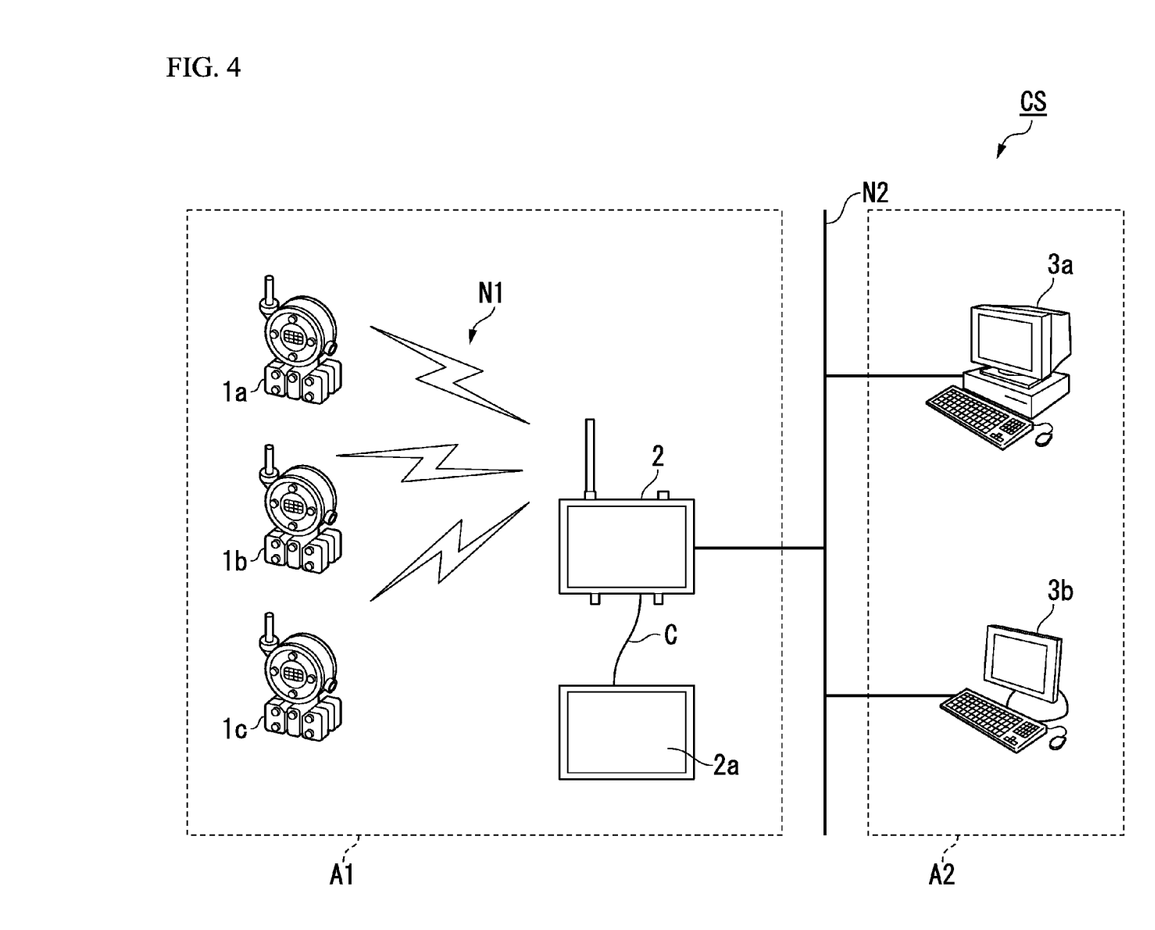
FIG. 4 is a block diagram showing a wireless gateway apparatus and a communication system in accordance with a second preferred embodiment of the present invention.

FIG. 4 is a block diagram showing a wireless gateway apparatus and a communication system in accordance with a second preferred embodiment of the present invention. In the second preferred embodiment shown in FIG. 4, the display device 2a is separated from the main unit of the wireless gateway apparatus 2. The display device 2a and the wireless gateway apparatus 2 are connected by a cable C (connecting cable). In the second preferred embodiment, the device information Q1 and the connection information Q2 sent from the wireless gateway apparatus 2 via cable C are displayed on the display device 2a.

Figure 5:
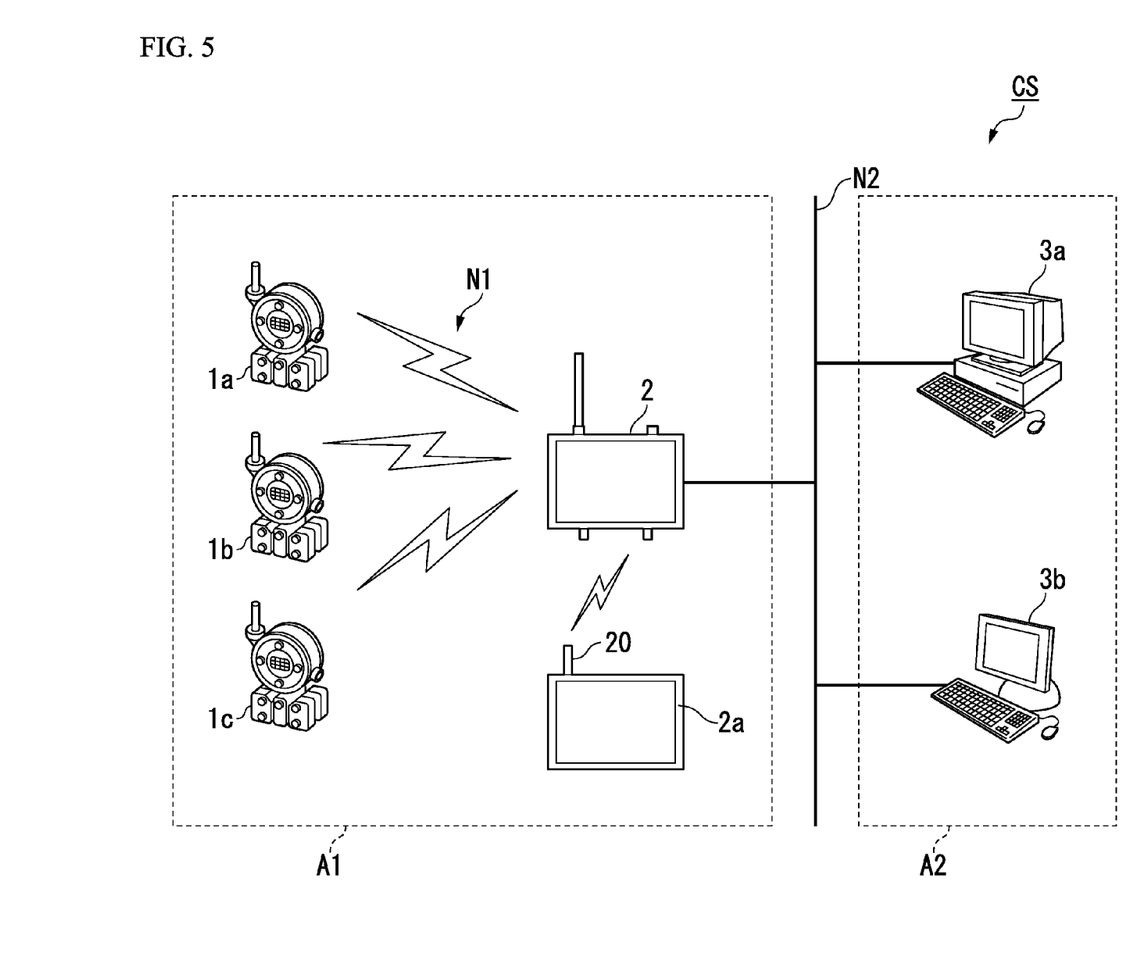
FIG. 5 is a block diagram showing a wireless gateway apparatus and a communication system in accordance with a third preferred embodiment of the present invention.

FIG. 5 is a block diagram showing a wireless gateway apparatus and a communication system in accordance with a third preferred embodiment of the present invention. In the third preferred embodiment shown in FIG. 5, the display device 2a is separated from the main unit of the wireless gateway apparatus 2. The display device 2a and the wireless gateway apparatus 2 are capable of wireless communication. The display device 2a includes a wireless communication unit 20 (second wireless communication unit) capable of wireless communication with the wireless gateway apparatus 2. The display device 2a receives and displays the device information Q1 and the connection information Q2 sent from the wireless gateway apparatus 2. The wireless communication unit 20 can also transmit to the wireless gateway apparatus 2 operation information from the touch panel provided in the display device 2*a*.

The wireless communication unit 20 provided in the display device 2*a* may be capable of wireless communication conforming to the ISA 100.11a wireless communication standard, and may be capable of wireless communication conforming to a wireless communication standard that is completely different from the ISA 100.11a wireless communication standard. By using a wireless communication unit 20 capable of wireless communication conforming to the ISA 100.11a wireless communication standard, even if a wireless communication unit is not provided anew in the wireless gateway apparatus 2, it is possible to communicate wirelessly between the wireless gateway apparatus 2 and the display device 2*a*.

As indicated by the second and third preferred embodiments, by separating the display device 2*a* from the main unit of the wireless gateway apparatus 2, even if the main unit of the wireless gateway apparatus 2 is installed, for example, in a high location that is difficult to reach, by installing the display device 2*a* in a low location that is easy for a maintenance worker to view, it is possible to facilitate the verification of the device information Q1 and the connection information Q2 displayed on the display device 2*a*. By doing this, it is possible to improve the work efficiency of maintenance personnel.

The present invention provides a wireless gateway apparatus capable of efficient and easy verification of on-site conditions.

According to the preferred embodiment of the present invention, because at least one of device information and connection information that indicates the status of connection with the wireless field device, which are acquired by communicating with a wireless field device, is displayed on a display device of the wireless gateway apparatus, it is easy to verify the on-site condition. By doing this, because there is no need, as there is conventionally, to visit the wireless field devices to verify device information or use a dedicated terminal to acquire device information or connection information by communicating with the wireless field device or the wireless gateway apparatus, it is possible to perform verification of on-site conditions efficiently and easily.

As used herein, the following directional terms "forward, rearward, above, downward, right, left, vertical, horizontal, below, transverse, row and column" as well as any other similar directional terms refer to those directions of an apparatus equipped with the present invention. Accordingly, these terms, as utilized to describe the present invention should be interpreted relative to an apparatus equipped with the present invention.

The term "configured" is used to describe a component, unit or part of a device includes hardware and/or software that is constructed and/or programmed to carry out the desired function.

Moreover, terms that are expressed as "means-plus function" in the claims should include any structure that can be utilized to carry out the function of that part of the present invention.

The term "unit" is used to describe a component, unit or part of a hardware and/or software that is constructed and/or programmed to carry out the desired function. Typical examples of the hardware may include, but are not limited to, a device and a circuit.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

What is claimed is:

1. A wireless gateway apparatus that forms a wireless communication network with wireless field devices, the wireless gateway apparatus comprising:
 a first wireless communication unit configured to communicate wirelessly with wireless field devices that have joined the wireless communication network; and
 a display unit configured to display both device information of the wireless field devices, which is acquired by communicating with the wireless field devices, and connection information, which indicates a condition of connection with the wireless field devices.

2. The wireless gateway apparatus according to claim 1, wherein
 the device information is at least one of characteristic information set into each of the wireless field devices and information indicating a current condition of each of the wireless field devices, and
 the connection information includes at least one of information indicating a number of connections of wireless field devices and information indicating whether or not communication between the wireless field device and the first wireless communication unit is possible.

3. The wireless gateway apparatus according to claim 1, further comprising: a control unit configured to be capable of changing information displayed on the display unit, in response to an external instruction.

4. The wireless gateway apparatus according to claim 1, wherein
 the display unit is configured to display the device information, which includes tag information and ID (identifier) information set for each of the wireless field devices and information indicating operating state and remaining battery capacity of each of the wireless field devices, the connection information, and instruction information indicating a wireless field device that needs a maintenance.

5. The wireless gateway apparatus according to claim 3, further comprising:
 a memory storing the device information and the connection information,
 wherein
 if a wireless field device is to be newly joined to the wireless communication network, the control unit references ID information included in a join request transmitted from the wireless field device and ID information that had been included in the device information stored in the memory beforehand and, based on a result of referencing, to determine whether or not the wireless field device is to be joined in the wireless communication network, and
 if the control unit determines that the wireless field device is to be joined in the wireless communication network, the control unit sets tag information with respect to the wireless field device to be newly joined, stores as the device information the set tag information, along with the ID information, into the memory, and increments information indicating the number of wireless field device connections that is included in the connection information stored in the memory, thereby increasing the number of wireless field devices that are joined into the wireless communication network.

6. The wireless gateway apparatus according to claim 3, further comprising:
a memory storing the device information and the connection information,
wherein
the control unit is configured to control the first wireless communication unit to communicate periodically or non-periodically with the wireless field devices via the wireless communication network so as to acquire the connection information of each of the wireless field devices and the device information of each of the wireless field devices, and to store the connection information and the device information into the memory.

7. A communication system comprising:
a wireless gateway apparatus that forms a wireless communication network with wireless field devices, the wireless gateway apparatus including a first wireless communication unit configured to communicate wirelessly with wireless field devices that have joined the wireless communication network; and
a display apparatus configured to display both device information of the wireless field devices, which is acquired by communicating with the wireless field devices, and connection information, which indicates a condition of connection with the wireless field devices, and wherein
the display apparatus is separated from the wireless gateway apparatus.

8. The communication system according to claim 7, wherein the display apparatus is connected to the wireless gateway apparatus by a connecting cable and displays both the device information and the connection information transmitted from the wireless gateway apparatus via the connecting cable.

9. The communication system according to claim 7, wherein the display apparatus includes a second wireless communication unit configured to communicate wirelessly with the wireless gateway apparatus, and displays both the device information and the connection information received from the wireless gateway apparatus via the second wireless communication unit.

10. The communication system according to claim 7, further comprising a control unit configured to be capable of changing information displayed on the display apparatus, in response to an external instruction.

11. A wireless communication method that forms a wireless communication network with wireless field devices to communicate wirelessly with wireless field devices that have joined the wireless communication network, the wireless communication method comprising:
acquiring device information of the wireless field devices and connection information, which indicates a condition of connection with the wireless field devices by communicating with the wireless field devices; and
displaying both the device information and the connection information.

12. The wireless communication method according to claim 11, wherein
the device information is at least one of characteristic information set into each of the wireless field devices and information indicating a current condition of each of the wireless field devices, and
the connection information includes at least one of information indicating a number of connections of wireless field devices and information indicating whether or not communication with the wireless field device is possible.

13. The wireless communication method according to claim 11, further comprising:
storing the device information and the connection information in a memory;
if a wireless field device is to be newly joined to the wireless communication network, referencing ID information included in a join request transmitted from the wireless field device and ID information that had been included in the device information stored in the memory beforehand and, based on a result of referencing, and determining whether or not the wireless field device is to be joined in the wireless communication network; and
setting tag information with respect to the wireless field device to be newly joined, storing as the device information the set tag information, along with the ID information, into the memory, and incrementing information indicating the number of wireless field device connections that is included in the connection information stored in the memory, thereby increasing the number of wireless field devices that are joined into the wireless communication network if the wireless field device is determined to be joined in the wireless communication network.

14. The wireless communication method according to claim 11, wherein
the acquisition of the device information and the connection information is performed periodically or non-periodically, and
the wireless communication method further comprises:
storing the connection information and the device information into a memory.

15. The wireless gateway apparatus according to claim 1, wherein
the display unit is configured to display on one screen simultaneously both the device information and the connection information.

16. The wireless gateway apparatus according to claim 15, wherein
the display unit is configured to display a list of the device information of a plurality of the wireless field devices and the connection information, which indicates a condition of connection with a plurality of the wireless field devices.

17. The communication system according to claim 7, wherein
the display apparatus is configured to display on one screen simultaneously both the device information and the connection information.

18. The communication system according to claim 17, wherein
the display apparatus is configured to display a list of the device information of a plurality of the wireless field devices and the connection information, which indicates a condition of connection with a plurality of the wireless field devices.

19. The wireless communication method according to claim 11, wherein
displaying both the device information and the connection information comprises displaying on one screen simultaneously both the device information and the connection information.

20. The wireless communication method according to claim 19, wherein
  displaying both the device information and the connection information comprises displaying a list of the device information of a plurality of the wireless field devices and the connection information, which indicates a condition of connection with a plurality of the wireless field devices.

\* \* \* \* \*